(12) United States Patent
Brodin (10) Patent No.: US 9,381,983 B2
(45) Date of Patent: Jul. 5, 2016

(54) METHOD AND SYSTEM FOR MONITORING THE STATUS OF DIVERS

(71) Applicant: AQWARY AB, Linkoping (SE)

(72) Inventor: Anders Brodin, Linkoping (SE)

(73) Assignee: AQWARY AB, Linkoping (SE)

( * ) Notice: Subject to any disclaimer, the term of this patent is extended or adjusted under 35 U.S.C. 154(b) by 0 days.

(21) Appl. No.: 14/441,851

(22) PCT Filed: Oct. 14, 2013

(86) PCT No.: PCT/EP2013/071380
§ 371 (c)(1),
(2) Date: May 10, 2015

(87) PCT Pub. No.: WO2014/075860
PCT Pub. Date: May 22, 2014

(65) Prior Publication Data
US 2015/0284062 A1    Oct. 8, 2015

(30) Foreign Application Priority Data

Nov. 13, 2012    (SE) ...................................... 1230123

(51) Int. Cl.
*B63C 11/26*    (2006.01)
*G01S 19/19*    (2010.01)
(Continued)

(52) U.S. Cl.
CPC . *B63C 11/26* (2013.01); *G01S 5/28* (2013.01); *G01S 19/19* (2013.01); *G01S 19/51* (2013.01)

(58) Field of Classification Search
CPC ......... B63C 11/26; G01S 19/19; G01S 19/51; G01S 5/28
USPC .................................. 701/468; 367/131–134
See application file for complete search history.

(56) References Cited

U.S. PATENT DOCUMENTS

| 5,075,693 | A | * | 12/1991 | McMillan | ............... | G01C 21/26 |
| | | | | | | 342/457 |
| 5,331,602 | A | * | 7/1994 | McLaren | ............... | G01S 5/0009 |
| | | | | | | 367/127 |

(Continued)

FOREIGN PATENT DOCUMENTS

EP    2175575 A1    4/2010

OTHER PUBLICATIONS

Vann RD, Lang MA, eds.,Recreational Diving Fatalities, Proceedings of the Diving Alert Network, Apr. 8-10, 2010, Durham, North Carolina, US.

(Continued)

*Primary Examiner* — Thomas Tarcza
*Assistant Examiner* — Tyler J Lee
(74) *Attorney, Agent, or Firm* — Olive Law Group, PLLC (57) ABSTRACT

This document provides a method of determining an absolute position of a diver, comprising: providing a dive leader unit having a GPS receiver and an underwater acoustic modem configured to retransmit GPS coordinates of the dive leader unit under water, providing the diver with a monitoring unit comprising several microphones so that it is possible to detect a direction of the dive leader unit, pairing the monitoring unit to the dive leader unit to form a communication network so as to identify differences between system clocks of the dive leader unit and the monitoring unit and make it possible to calculate a distance from the dive leader unit to the monitoring unit. In the monitoring unit, the following steps are performed: receiving the retransmitted GPS coordinates, detecting the direction of the dive leader unit, calculating the distance to the dive leader unit, and calculating the absolute position of the diver based on the retransmitted GPS coordinates, the direction of the dive leader unit and the distance from the dive leader unit to the monitoring unit.

4 Claims, 8 Drawing Sheets

(51) Int. Cl.
*G01S 5/28* (2006.01)
*G01S 19/51* (2010.01)

(56) References Cited

U.S. PATENT DOCUMENTS

| | | | | |
|---|---|---|---|---|
| 5,738,092 | A * | 4/1998 | Mock | B63C 9/0005 128/202.22 |
| 6,690,618 | B2 * | 2/2004 | Tomasi | G01S 5/18 367/124 |
| 6,941,226 | B2 | 9/2005 | Estep | |
| 7,272,074 | B2 * | 9/2007 | Basilico | G01S 1/72 367/128 |
| 7,333,394 | B2 * | 2/2008 | Basilico | G01C 21/00 367/124 |
| 7,505,367 | B2 * | 3/2009 | Abdi | H04B 11/00 367/134 |
| 2002/0109601 | A1 | 8/2002 | Arens | |
| 2006/0293806 | A1 * | 12/2006 | Basilico | G05D 1/0206 701/21 |
| 2007/0014189 | A1 | 1/2007 | Basilico | |
| 2008/0198695 | A1 * | 8/2008 | Abdi | H04B 11/00 367/134 |
| 2008/0291084 | A1 | 11/2008 | Thierry | |
| 2010/0299073 | A1 | 11/2010 | Metzler et al. | |
| 2011/0141853 | A1 | 6/2011 | Megdal et al. | |

OTHER PUBLICATIONS

PCT International Preliminary Report on Patentability for PCT International Application No. PCT/EP2013/071380, Applicant: AQWARY AB.
PCT International Search Report for PCT/EP2013/071380 mailed May 27, 2014.
PCT Written Opinion for PCT/EP2013/071380.

* cited by examiner

METHOD AND SYSTEM FOR MONITORING THE STATUS OF DIVERS

CROSS REFERENCE TO RELATED APPLICATIONS

This application is a 35 U.S.C. 371 application of International PCT Patent Application No. PCT/EP2013/071380, filed on Oct. 14, 2013, which claims priority to Swedish Patent Application No. 1230123-0 filed Nov. 13, 2012; all of the contents of which are hereby incorporated by reference herein in their entireties.

TECHNICAL FIELD

The present invention relates to a method and systems for positioning and monitoring the status of divers.

BACKGROUND

Diving computers are commonly used by divers to monitor key parameters, such as remaining air, present depth, compass (direction), etc. This has changed the way dives are planned. Before the diving computer was introduced, each dive was carefully planned and the diving schedule was decided in advance. With a diving computer, divers rely on it and usually turn to the surface when there is a certain air level in the tank, such as ⅓ remaining air (100 bar air pressure).

In more advanced prior art systems, it is possible to optimize the diving time by programming the monitoring unit to measure the air consumption for the diver and thereafter calculate the remaining time. However, this requires the diver to be observant regarding the remaining time provided from the monitoring unit instead of the usual key parameter, i.e. remaining air.

In the eighties, it was a natural part of diving to tie the divers together with a rope, a so called "buddy line", but this is nowadays more seldom used. Today, divers try to keep their dive partners under observation but accidents regularly happen and a dive partner is lost.

In a publication by Vann R D, Lang M A, eds. with the title "Recreational Diving Fatalities". Proceedings of the Divers Alert Network 2010 April 8-10 Workshop. Durham, N.C.: Divers Alert Network, 2011. ISBN #978-0-615-54812-8, which is incorporated by reference, it is stated on page 41 that "Every year, approximately 125 divers die in North America, Europe and Asia (Denoble, Vann 2009)."

Furthermore, a staggering number of 947 recreational open-circuit scuba diving deaths from 1992 to 2003 was presented in the publication. The major cause of death is drowning (70%) but the reasons behind the deaths are more difficult to determine. On page 45 in the publication, last paragraph, it is stated "Although triggers were identified in only one-third of cases (346 of 947), the most common triggers were identified as insufficient gas (41 percent), entrapment (20 percent) and equipment problems (15 percent). Similarly, disabling agents were identified in only one-third of cases (332 of 947); however, emergency ascent (55 percent), insufficient gas (27 percent), and buoyancy trouble (13 percent) were the most common disabling agents and, together, accounted for 95 percent of the 332 deaths."

From these observations, it is clear that there is not only important to monitor your own key parameters when diving, but also monitor your dive partner's key parameters to prevent any of the above mentioned triggers or disabling agents.

A system providing a solution to this need has been presented by a company called Liquivision, and the system (named Lynx) operates using ultrasonic waves. The system is briefly described in connection with FIG. 1 and transmitters, either on a diver 1, on a boat 2 or stand alone on the bottom 3, creates an underwater network based on ultrasonic waves. Specially designed dive computers carried by the divers can receive the transmitted ultrasonic waves and obtain information from the transmitters.

A drawback with the system presented by Liquivision is that the information transmitted within the network is one way, and communication between divers cannot be achieved.

There is also a desire to provide improved positioning of divers. While vehicles and persons moving about on land or in the air may use GPS or similar satellite based systems, this is not possible for divers due to the attenuation of radiowaves in water. There is thus a need for an improved method of positioning a diver under water.

SUMMARY OF THE INVENTION

One object of the present invention is to provide a system which enables absolute positioning of a diver.

Another object with the present invention is to provide a system for monitoring the status of divers, the system being provided with improved knowledge of diver specific information of dive partners compared to prior art systems.

According to a first aspect, there is provided a method of determining an absolute position of a diver. The method comprises providing a dive leader unit having a geographic positioning system, such as GPS, receiver and an underwater acoustic modem configured to retransmit GPS coordinates of the dive leader unit under water, providing the diver with a monitoring unit comprising several microphones so that it is possible to detect a direction of the dive leader unit, providing synchronisation between the dive leader unit and the monitoring unit to make it possible to calculate a distance from the dive leader unit to the monitoring unit. The method further comprises in the monitoring unit: receiving the retransmitted position coordinates, detecting the direction of the dive leader unit, calculating the distance to the dive leader unit, and calculating the absolute position of the diver based on the retransmitted position coordinates, the direction of the dive leader unit and the distance from the dive leader unit to the monitoring unit.

The dive leader unit may be an integrated unit which is positioned at the surface, such as a buoy. Alternatively, it may be formed of two or more parts, one of which being positioned at least partially below the surface and one being positioned at least partially above the surface. Such two-part dive leader units may be positioned on a floating vessel, such as a boat, raft, etc.

A geographic positioning system may be any type of system used for providing the geographic position of the dive leader unit including satellite based systems and beacon based systems, e.g. using radio, sound or light to establish the position of the dive leader unit. Several such systems are known, e.g. GPS (Global Positioning System), Gallileo and BeiDou).

The method may further comprise pairing the monitoring unit to the dive leader unit to form a communication network so as to identify differences between system clocks of the dive leader unit and the monitoring unit The method may further comprise measuring a depth and/or motion and using also the depth and/or motion in calculating the absolute position of the diver.

The motion may be measured by means of a motion sensor, such as a gyro, an accelerometer, a compass (magnetometer—preferably a 3D compass), According to a second aspect, there is provided a system for determining an absolute position of a diver. The system comprises a dive leader unit having a geographic positioning system, such as GPS, receiver and an underwater acoustic modem configured to retransmit position coordinates of the dive leader unit under water, a monitoring unit associated with the diver and comprising several microphones so that it is possible to detect a direction of the dive leader unit, means to pair the monitoring unit with the dive leader unit so as to identify differences between the system clocks of the monitoring unit and the dive leader unit such that it is possible to calculate a distance from the dive leader unit to the monitoring unit, and processing means in the monitoring unit arranged to receive the retransmitted position coordinates, detect the direction of the dive leader unit, calculate the distance to the dive leader unit, and calculate the absolute position of the diver based on the retransmitted GPS coordinates, the direction of the dive leader unit and the distance from the dive leader unit to the monitoring unit.

The monitoring unit may further comprise means for to pair the monitoring unit with the dive leader unit so as to identify differences between the system clocks of the monitoring unit and the dive leader unit The monitoring unit may further comprise at least one of a depth meter and a motion sensor and wherein the processing means is further arranged to use also the depth and/or motion sensor data in calculating the absolute position of the diver. The monitoring unit may comprise three or more microphones, e.g. four, five or six microphones, which may be positioned to define corners of a three-dimensional body.

According to a third aspect there is provided a system for monitoring the status of a plurality of divers. The system comprises a monitoring unit associated with each diver and each monitoring unit collects diver specific information adapted to be presented to the associated diver. Each monitoring unit is provided with a unique identity, and the system further comprises: means to communicate diver specific information between the monitoring units associated with the plurality of divers, and means to present the diver specific information to indicate the status of the plurality of divers.

An advantage with the present invention is that key parameters derivable from diver specific information of a diver is communicated to one or more monitoring units, thereby increasing the probability to detect any problem that the diver may be experiencing compared to prior art systems.

An object with a preferred embodiment is to provide a system in which a higher security is achieved compared to prior art systems.

An object of a preferred embodiment is achieved by a system further comprising means to pair selected monitoring units with each other to form a communication network. The system also comprises a dive leader unit paired to the communication network, wherein the dive leader unit is adapted to receive information from all monitoring units paired to the communication network.

An advantage with the preferred embodiment of the present invention is that a dive leader can call for help when the diver specific information from a diver indicates problems even before the divers have ascended. Also, the dive leader may transmit an alarm signal to all divers to alert them if needed during a dive.

Said means to pair selected monitoring units with each other to form a communication network may be arranged so as to identify differences between the individual system clocks of the monitoring units and make it possible to calculate a respective distance from a transmitting unit to a monitoring unit.

Each monitoring unit may comprise microphones, preferably at least three, so that it is possible to detect the direction of the transmitting unit.

The system may comprise a geographic positioning system, such as GPS, receiver attached to the dive leader unit, and wherein the dive leader unit is configured retransmit the position coordinates to the monitoring units under the water in order for them to calculate their individual absolute positions based upon the retransmitted position coordinates.

The system may further comprise a depth meter and/or a motion sensor and the monitoring unit may be further configured to use also the depth and/or motion data in calculating the absolute position of the diver.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

Figure 1:
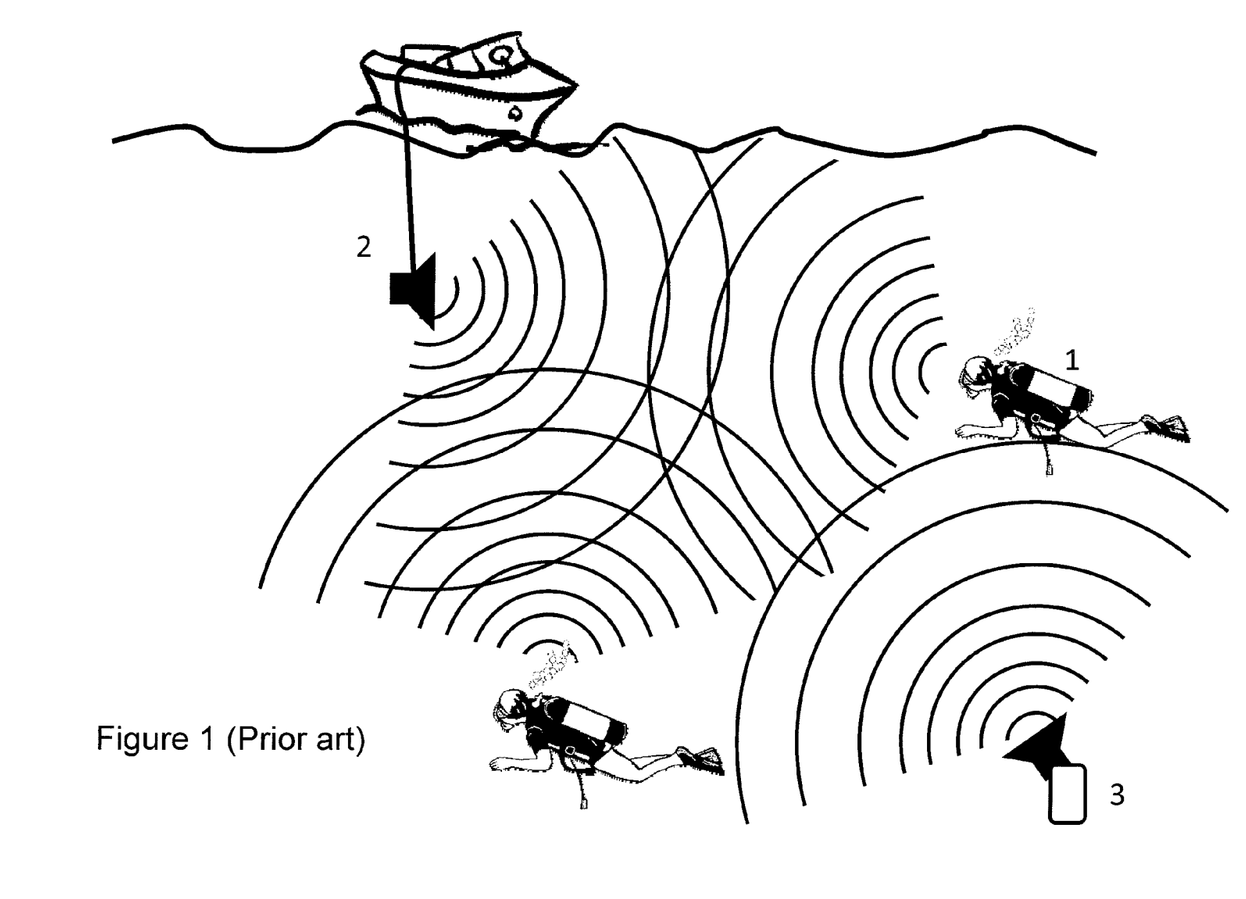
FIG. 1 shows a prior art system.

FIG. 1 shows a prior art system designed by Liquivision and is called Lynx Omniscient Family, which consists of the Lynx air and nitrox color OLED dive computer (attached to the wrist of each diver), Lynx tank transmitter 1, Lynx location transmitter 3 and the Lynx Omniscient Boat Kit 2. They can be used in combination or separately. Each wrist computer can monitor up to ten wireless (tank or location) transmitters and it can receive text messages sent from the Lynx Omniscient Boat Kit.

Using ultrasonic technology, the Lynx computer can receive a signal within 330 feet/100 meters. It can also detect the direction of the wireless signal, and guide the diver towards it.

The wrist computer is equipped with 3 ultrasonic transducers which allow it to receive wireless transmission from up to ten Lynx transmitters, within a range of 330 feet/100 meters, and to triangulate the source of each signal. The wireless signal is translated into a continuously adjusted bearing, which allows the diver to swim towards the source of the signal (e.g. the wireless transmitter on another diver's tank, or a location transmitter affixed to a landmark, such as the dive boat's anchor line). However, no communication can be established between divers or from any diver to the dive leader in the boat.

Figure 2:
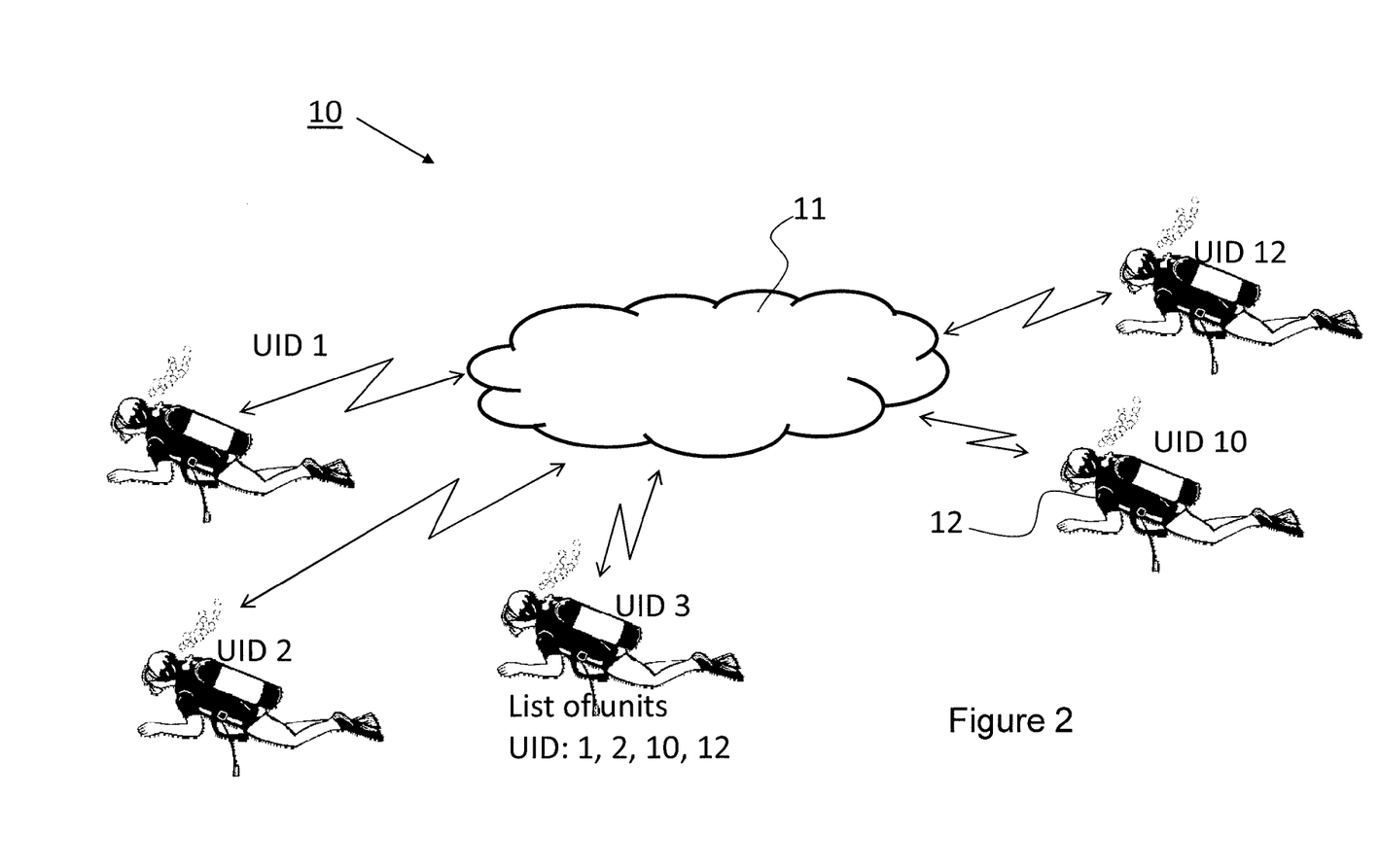
FIG. 2 shows a first embodiment of a system according to the invention.

FIG. 2 shows a first embodiment of a system 10 according to the invention comprising an underwater network 11 that allows up to seventy divers or monitoring units 12 to simultaneously connect to the network with the purpose of sharing information with other units connected to the network. All connected units have a unique identifier UID1, UID2, UID3, UID10 and UID12 that allows the units to identify other units when exchanging information. The unique identifier is designed to make sure that all produced units are unique.

When using the system a list is kept in each unit that consist of other units close by or units that are paired to each other in advance to form the communication network 11. Each monitoring unit carried by an associated diver is designed to communicate with the under water network preferably using a digital communication signal, such as a communication signal implemented as TCP/IP under water.

The system is preferably adapted to handle two types of signals:
 information signals with diver specific information, and
 acknowledgement signals from an intended receiver of the information.

In a preferred embodiment, the system is designed to communicate diver specific information using an underwater acoustic modem, and by pairing selected monitoring units with each other a communication network is formed.

The system may also comprise a dive leader unit paired to the communication network, wherein the dive leader unit preferably is adapted to receive information from all monitoring units paired to the communication network and also provided with means to communicate with a specific monitoring unit or with all monitoring units connected to the network.

Figure 3:
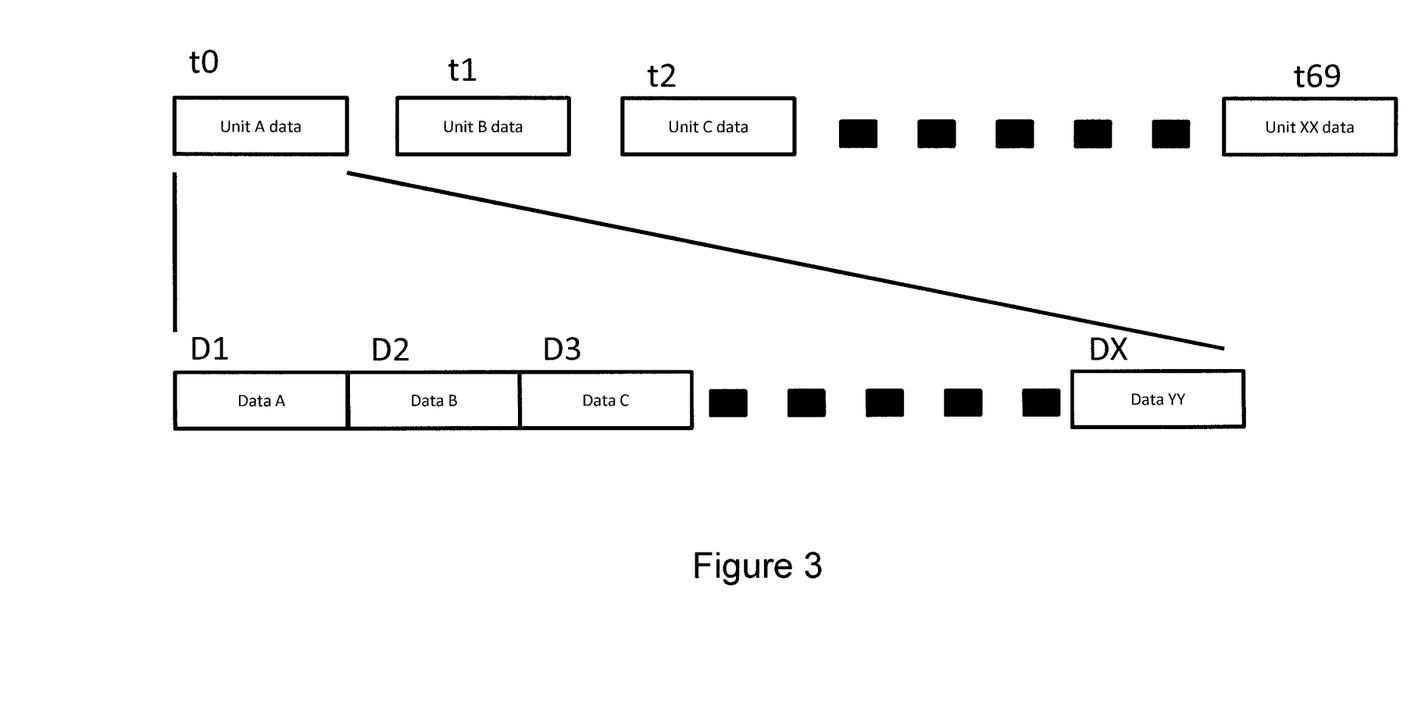
FIG. 3 illustrates a suitable data communication protocol for the invention.

FIG. 3 illustrates a suitable data communication protocol for the invention. The underwater network may use a time division setup where all monitoring units temporarily are assigned to a slot (t0-t69) to be used when communicating, thereby avoiding collision of signals under water.

In each slot there is room for a number of data-blocks D1-DX to be transmitted.

Figure 4:
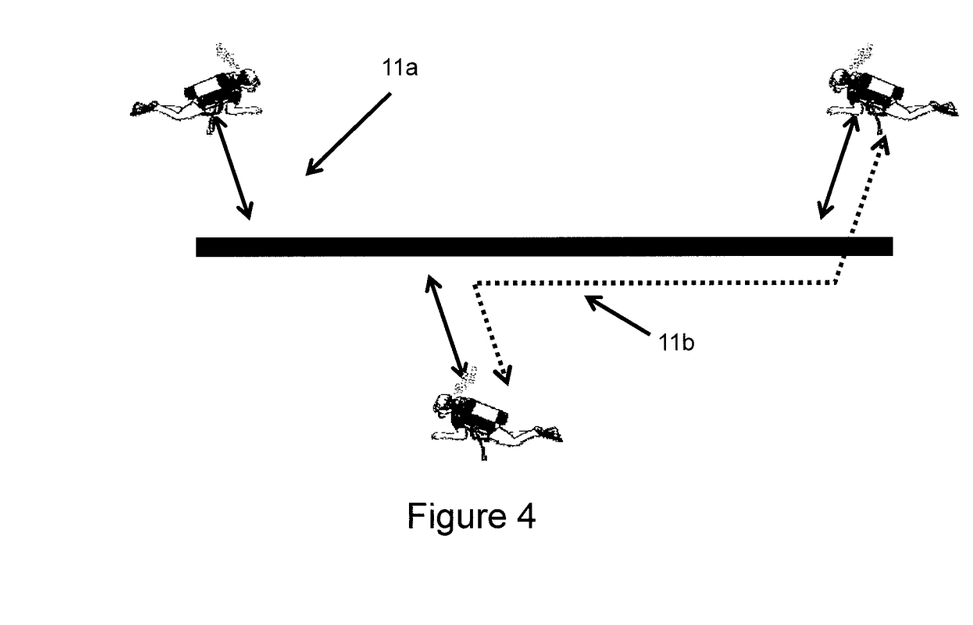
FIG. 4 shows how information between divers can be shared according to the invention.

FIG. 4 shows how information between divers can be shared according to the invention. Based on the network structure described above, each unit can either share data (for example tank data or user behavior data) in a broadcast manner 11a, send general messages or establish a point to point connection 11b for ad hoc messaging.

Figure 5:
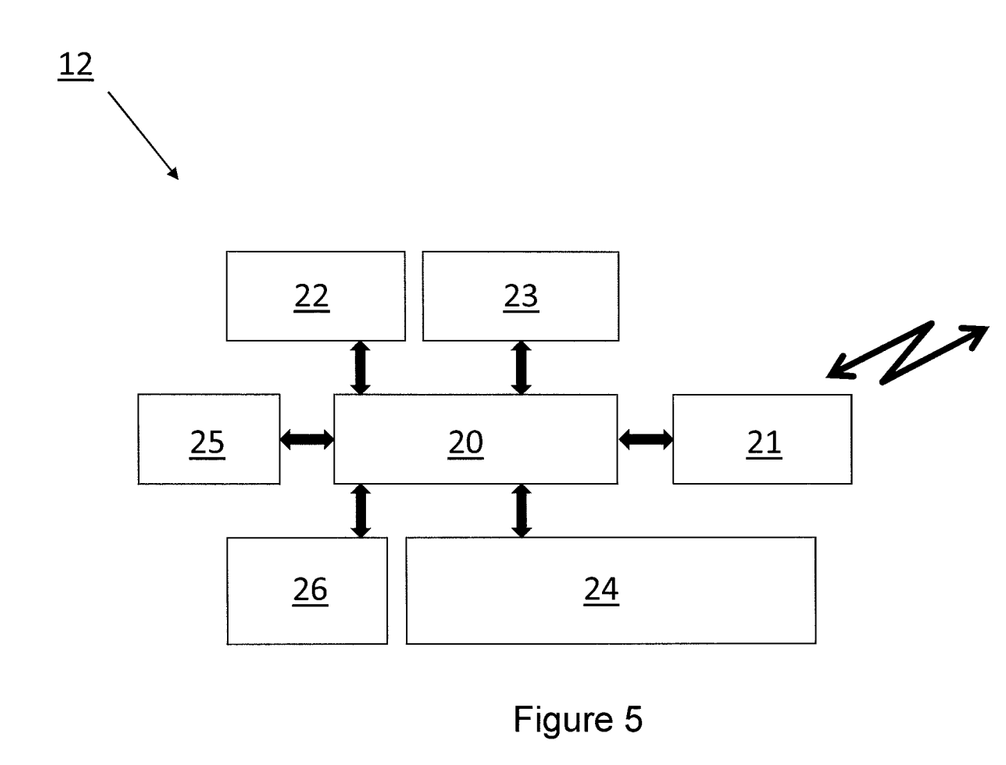
FIG. 5 shows a block diagram of a monitoring unit according to the invention.

FIG. 5 shows a block diagram of a monitoring unit 12 according to an embodiment of the invention. The hart of the monitoring unit is the processor unit 20 that establishes connection with the network using a modem 21. Relevant information regarding diver specific data such as: depth, air pressure, direction, pulse, and irregular breathing, may be presented on a display 22 and button and controls 23 are used to navigate on the unit.

Physical sensors 24 generates diver specific data to be analysed and transmitted to other monitoring units in the network, and some data may be stored in a memory 25 for future need. The status of the internal battery 26 of the monitoring unit may be checked as a safety feature on a regular basis.

Figure 6:
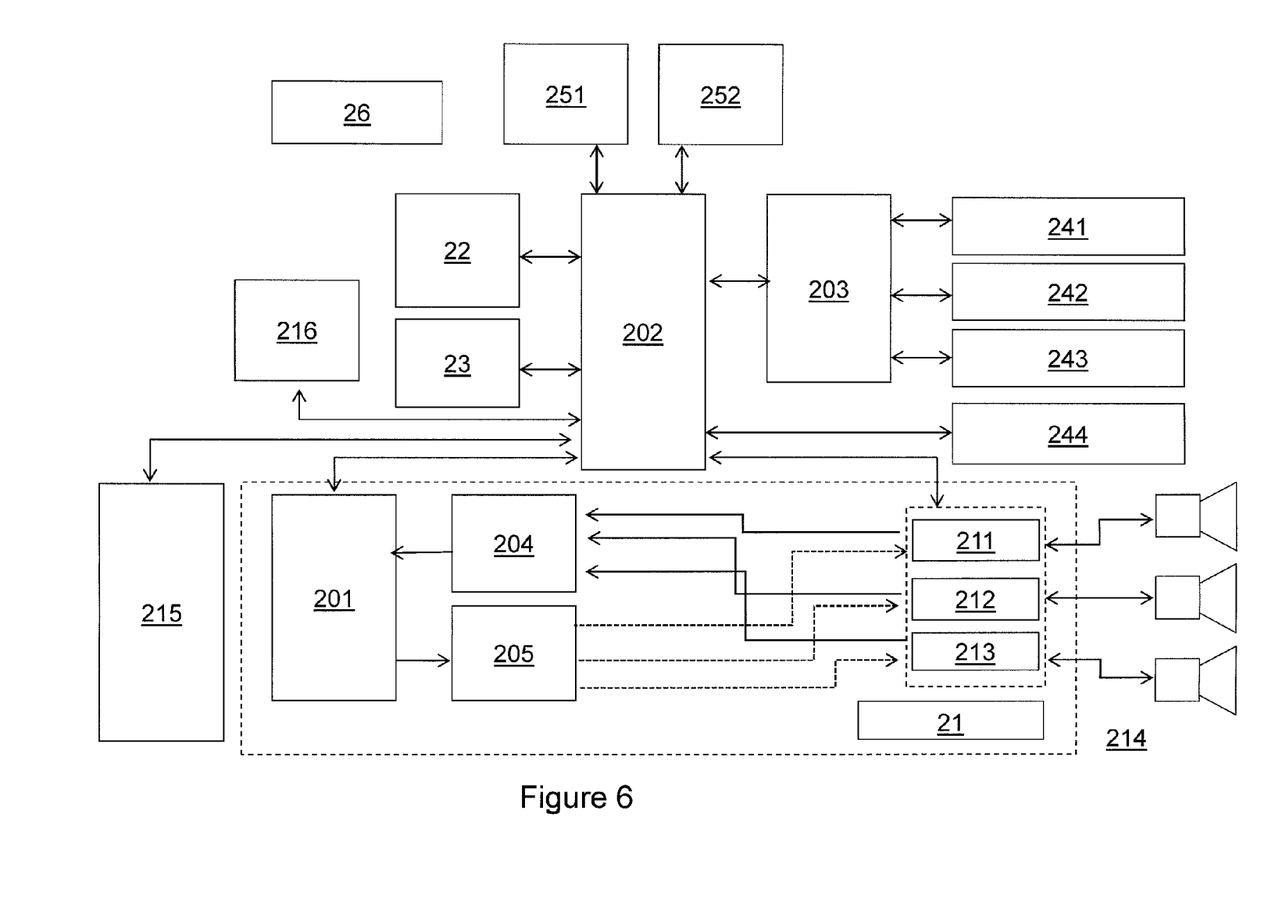
FIG. 6 shows a detailed schematic of the monitoring unit in FIG. 5.

FIG. 6 shows a detailed schematics of the monitoring unit in FIG. 5 and there may be one or more ultrasonic transducers to handle send and receive, measuring sensors may be connected via a A/D Converter or directly to the processing unit. Apart from ultrasonic transmitters 211, 212, 213, 214 for the underwater network there are also support for WIFI networks 216 for land based communication and a short range underwater modem 215 for connecting other devices such as dive computers or sensors to the network. Such a short range underwater modem 215 may be arranged to use e.g. radio communication in a frequency range having specific attenuation characteristic in water, such that wireless communication over only short distances is enabled.

The system indicated in FIG. 6 includes a digital signal processor 201, which via A/D converters is arranged to receive signals from the transducers 211, 212, 213, 214 and which via D/A converters is arranged to provide signals to the transducers 211, 212, 213, 214.

The system may further comprise a microcontroller unit 202 in communication with physical sensors, such as a tank pressure transducer 241, depth measurement transducer 242, temperature transducer 243 and digital sensors 244, such as gyros, compass, etc. The communication may be achieved via an A/D converter 203. The system may further comprise memory in the form of e.g. a RAM 251 and an EEPROM 252 for storing data, temporarily and permanently, respectively.

The system may further comprise a power supply 26 and a user interface comprising a display 22 and keys 23, e.g. in the form of buttons or the like.

Figure 7:
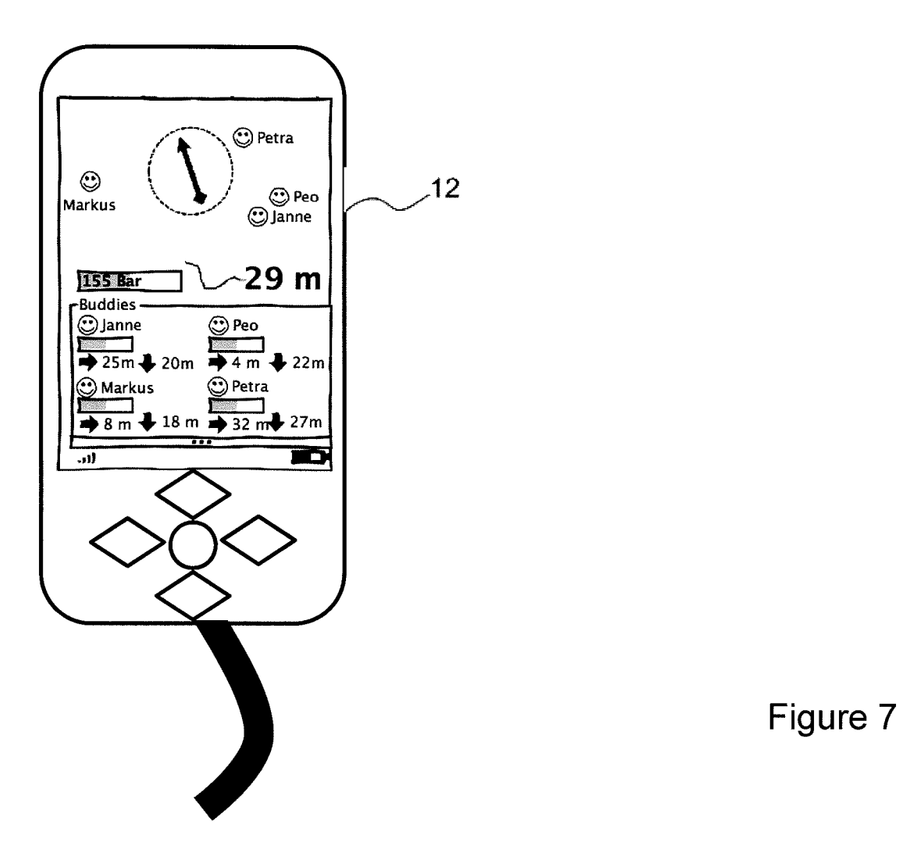
FIG. 7 shows an embodiment of a display of a monitoring unit according to the invention.

FIG. 7 shows a display of a monitoring unit according to the invention. The display is configured to show the diver specific data of the associated diver in the upper part. In this embodiment a direction is indicated using a digital compass, the dive profile and the current depth as well as the level of air in the tank graphically and by a number.

In addition, the display also shows the status of divers that has paired their monitoring unit with this unit. In this example four other divers data is visible, such as level of air in the respective tank, depth and distance. It is of course possible to add other information, such as the direction to other divers (as indicated in the upper part of the display.

The invention relies on the creation of a two-way communication network, which preferably is ultrasonic. A channel is created between the paired monitoring units and the modulation and utilization of the channel is adaptive, which means that if there is a need to transfer an image over the network, the speed can be temporarily be increased and also increase the allocation of the ones that need to exchange information. It i further conceivable the bandwidth is sacrificed in case of an alarm in order to increase the range.

It is also possible to relay information transmitted from a first monitoring unit to a second monitoring unit via a third monitoring unit in case it appears that the information did not reach the intended receiver, due to something blocking the communication channel or if the receiver is out of range. An acknowledgement signal will assure that the transmitted information reaches the intended receiver as is obvious for a skilled person in the art. This is especially important in case of an alarm.

The adaptive feature may also reduce the power that is used for transmission to save battery capacity. Furthermore, it is also possible to reduce the transmission frequency to minimize the energy needed to maintain communication in case the battery component is very low to ensure safe operation during the dive.

The network also provide the possibility to share data, the result of measurements (such as depth and air pressure in the tank). Furthermore, it is possible to monitor and share information related to the behaviour of the diver to identify problems (e.g. rapid breathing, poor stability in the water, etc.) There is also possible to send arbitrary messages between divers having paired monitoring units to initiate a chat function or to act if a dive partner seems to experience difficulties.

A type of data that can be shared is an alarm that makes everyone aware of the condition of a diver. This can be initiated by the diver in distress or through the identification of a serious condition of the diver (such as lack of breathing) or a state of very little remaining air in the tank of the diver.

Data should not be limited to text files, and should also encompass images, sounds etc. It is preferred that all data (three dimensional coordinates if possible) are stored containing at least depth to make sure that it can be presented after the dive or be shared on a webpage for divers (e.g. facebook or similar).

The paired monitoring units use synchronized clocks (through handshake procedures) to indentify differences between the individual system clocks of the monitoring units and it is therefore possible to calculate the distance from the transmitting unit. Several microphones in the monitoring unit makes it possible to detect the direction of the transmitting unit.

In a preferred embodiment, a GPS receiver is attached to a unit, such as the dive leader unit that may be situated in a boat at the surface. The GPS receiver may be a mobile telephone and the dive leader unit is configured retransmit the GPS coordinates to the monitoring units under the water in order for them to calculate their individual absolute position based upon the retransmitted GPS coordinates. With absolute positions, it is possible to use three dimensional maps for certain dive spots.

A major advantage with the system according to the invention is that other manufacturers can have access to the communication channel in order to transmit data between their units (e.g. between two dive computers) although the system according to the invention cannot interpret the transmitted data, but has the ability to transfer the data to the correct receiving unit. The connection to the communication network can for instance be realized through similar techniques as pressure sensors and computers communicate today as is obvious for a skilled person in the art.

Three different types of monitoring units is available in the system according to the invention. The first type is a mobile unit that a diver keeps with him/her during the dive. The second type is a dive leader unit that is positioned in a predetermined position (e.g. in a boat or at the shore by the dive site) together with the dive leader. An finally, the third type is a fixed unit that acts like an under water bouy to mark an interesting position (e.g. a cave).

Figure 8:
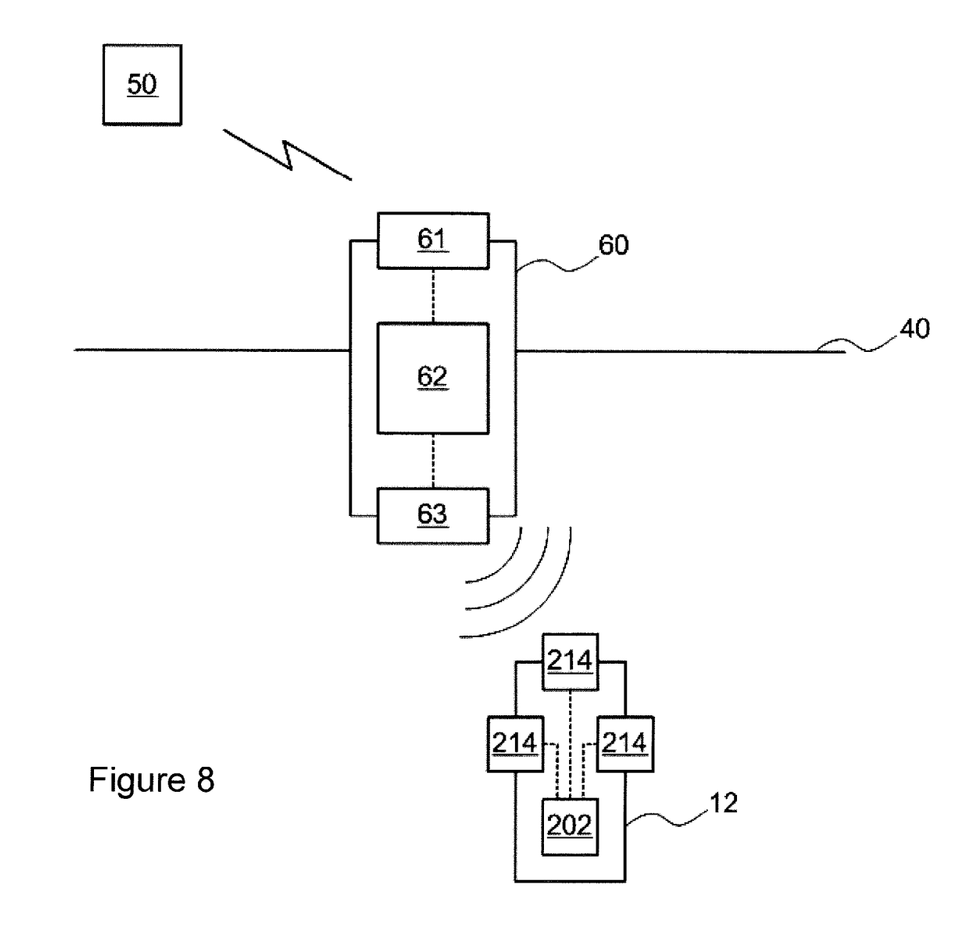
FIG. 8 shows an embodiment of a dive leader unit.

Referring to FIG. 8, in one embodiment, the dive leader unit may take the form of a buoy 60, which is designed such that when floating on the water surface 40, an upper part thereof is above the water surface and a lower part thereof is below the water surface.

The upper part may be provided with a receiver 61 for navigational information, such as a GPS receiver. The lower part may be provided with an ultrasonic, or sonar, transmitter 63.

The dive leader unit may further comprise a processing device 62, which is arranged to receive the navigational information from e.g. a satellite 50 and to determine an absolute position of the dive leader unit based on the navigational information. The processing device 62 may further be arranged to send out, or retransmit, a signal indicative of the dive leader unit's absolute position via the ultrasonic transmitter 63.

As described above, the monitoring unit 12 comprises transducers 214 arranged to receive the signal indicative of the dive leader unit's absolute position and by means of the processing device 20 calculate the distance and direction to the dive leader unit and thus to derive the actual position of the monitoring unit 12 and thus of the diver. The calculation may also make use of a separately measured depth in order to more accurately calculate the distance to the dive leader unit.

The invention claimed is:

1. A method of determining an absolute position of a diver, comprising:

providing a dive leader unit having a geographic positioning system, such as GPS, receiver and an underwater acoustic modem configured to retransmit position coordinates of the dive leader unit under water, providing the diver with a monitoring unit comprising at least three microphones so that it is possible to detect a direction of the dive leader unit, providing synchronization between the dive leader unit and the monitoring unit to make it possible to calculate a distance from the dive leader unit to the monitoring unit, and in the monitoring unit:

receiving the retransmitted position coordinates, detecting the direction of the dive leader unit, calculating the distance to the dive leader unit, and calculating the absolute position of the diver based on the retransmitted position coordinates, the direction of the dive leader unit and the distance from the dive leader unit to the monitoring unit, the method further comprising:

synchronizing the system clocks of the dive leader unit and the monitoring unit through a handshake procedure, and pairing the monitoring unit to the dive leader unit to form a communication network so as to identify differences between system clocks of the dive leader unit and the monitoring unit, wherein the communication network uses a time division setup where monitoring units temporarily are assigned to a slot to be used when communicating, each slot having room for a number of data-blocks to be transmitted.

2. The method as claimed in claim 1, further comprising measuring a depth and/or motion and using also the depth and/or motion in calculating the absolute position of the diver.

3. A system for determining an absolute position of a diver, comprising:

a dive leader unit having a geographic positioning system, such as GPS, receiver and an underwater acoustic modem configured to retransmit position coordinates of the dive leader unit under water, a monitoring unit associated with the diver and comprising at least three microphones so that it is possible to detect a direction of the dive leader unit, wherein the system is configured to provide synchronization between the dive leader unit and the monitoring unit, such that it is possible to calculate a distance from the dive leader unit to the monitoring unit, and processing unit in the monitoring unit arranged to receive the retransmitted position coordinates, detect the direction of the dive leader unit, calculate the distance to the dive leader unit, and calculate the absolute position of the diver based on the retransmitted GPS coordinates, the direction of the dive leader unit and the distance from the dive leader unit to the monitoring unit, the system further being configured to:

synchronize the system clocks of the dive leader unit and the monitoring unit through a handshake procedure, pair the monitoring unit with the dive leader unit so as to identify differences between the system clocks of the monitoring unit and the dive leader unit, and a communication network, formed by pairing the monitoring unit with the dive leader unit, using a time division setup where monitoring units temporarily are assigned to a slot to be used when communicating, each slot having room for a number of data-blocks to be transmitted.

4. The system as claimed in claim 3, wherein the monitoring unit further comprises at least one of a depth meter and a motion sensor and wherein the processing unit is further arranged to use also the depth and/or motion sensor data in calculating the absolute position of the diver.

\* \* \* \* \*